Jan. 20, 1942. I. A. WEAVER ET AL Re. 22,012

FLUID-OPERATED ELECTRIC SWITCH

Original Filed July 25, 1940

INVENTOR.
Ira H. Weaver
Clyde H. Phelps

BY Walter M. Fuller Atty

Reissued Jan. 20, 1942

Re. 22,012

UNITED STATES PATENT OFFICE 22,012

FLUID-OPERATED ELECTRIC SWITCH

Ira A. Weaver and Clyde H. Phelps, Springfield, Ill., assignors to Weaver Manufacturing Company, Springfield, Ill., a corporation of Illinois Original No. 2,225,190, dated December 17, 1940, Serial No. 347,370, July 25, 1940. Application for reissue October 16, 1941, Serial No. 415,330

5 Claims. (Cl. 200—81)

An important use of the novel and superior circuit-closer constituting the subject-matter of the present invention is in the industrial testing of containers or receptacles, such as various sizes and shapes of tin-cans, for leakage, the present practice in container manufacture employing a system wherein a fluid-pressure, such as that of air, is introduced into the can to be examined, before its top is sealed on, to ascertain whether or not the can is free from leakage.

The ordinary and usual system or procedure is to apply an exact fluid-pressure to the interior of the can or container, whose unsealed top is temporarily closed in seal-proof manner, a diaphragm-unit, in series relation in the conduit or pipe supplying the pressure, shutting off the air-supply to such unit when the proper pressure has been internally applied to the can, and then, if there is a drop in the pressure in the can due to escape of air therefrom by reason of a defect in the can, the diaphragm of the unit automatically operates electric contact-points to modify or close an electric-circuit whereby to actuate an ejection-apparatus to discard or reject the defective can.

Such a system is relatively slow in operation and not particularly effective in action by reason of the fact that a minute or slight leak requires a relatively-long time-period to produce a sufficient pressure decrease in the contained fluid to actuate the diaphragm to close or open the associated electric-circuit, as the case may be, and, obviously, the initial injected pressure must be very exact and precise to cause the contact-points to move to a given point for each pressure application.

The automatic control-valve or fluid-actuated electric-switch incorporating the present invention functions in a somewhat similar manner, except that it is capable of use with comparatively-coarse pressure-regulation operating equally well over a wide pressure-range applied to the valve or switch and the associated container, such pressure latitude or scope upwardly being limited or restricted only by the strength of the structural materials employed in its manufacture.

The new circuit-closer embodying the present invention is inexpensive to produce, it is unlikely to become damaged or injured in ordinary service, and it is reliable in the results produced being adequately sensitive in its functioning capacities to provide comparatively quick and dependable effects.

If the switch or circuit-closer is made of transparent material, it can well be used as an indicator.

Further, the new and improved switch can operate satisfactorily from either positive or partial-vacuum pressure change.

To the accomplishment of these and other desirable results and purposes of the invention, present preferred embodiments thereof have been illustrated in the accompanying drawing forming a part of this specification and to which reference should be had in connection with the following detailed description, and, for simplicity, like reference numerals have been employed to designate the same structural parts or elements throughout the several views.

Figure 3:
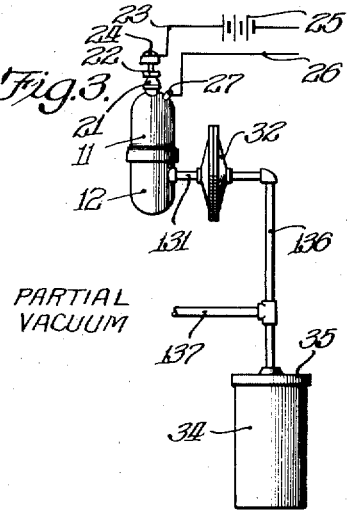

Figure 3 presents a system using a partial-vacuum in the can and switch; and

Figure 4:
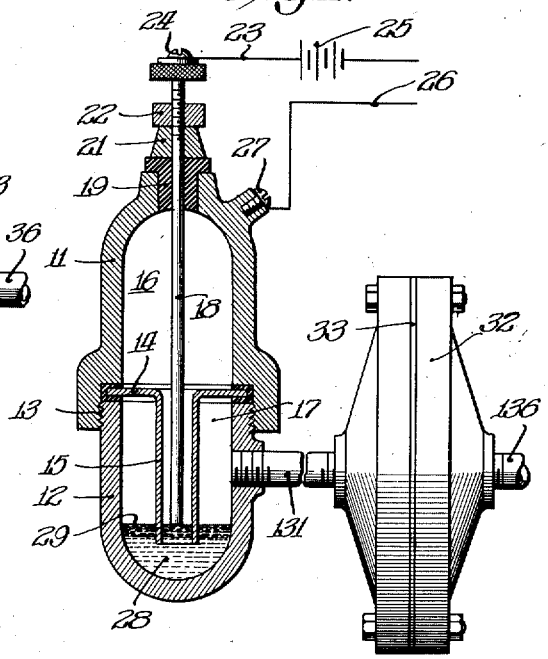

Figure 4 shows the switch in section employed in such sub-atmospheric system of Figure 3.

Figure 2:
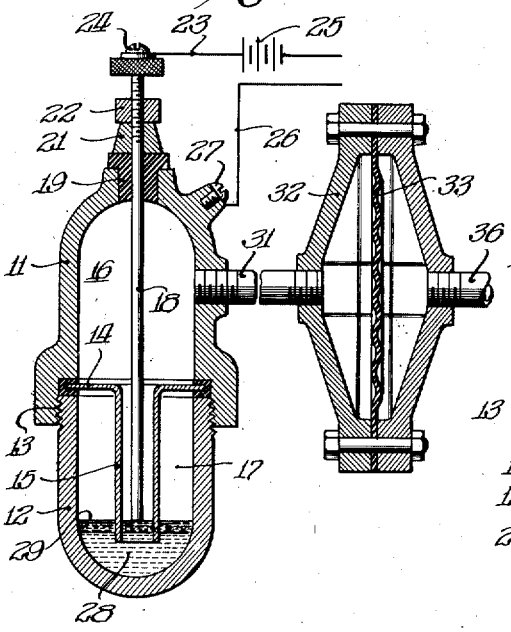
Figure 2 is an enlarged cross-section through the new fluid-actuated electric-switch employed in the system of Figure 1.

Referring to the drawing it will be readily perceived that the appliance includes a two-part round casing 11, 12 complementarily screw-threaded at 13 to allow their union or separation, the marginal or border portion of a thin wall 14 being confined in pressure-tight relation between the interfitting two sections of the casing, the center of such wall being formed as a tube 15 opening upwardly through the wall and depending into the lower section of the casing, whereby the latter is divided into sections forming an upper chamber 16 above the wall and a companion lower chamber 17 below the wall, the two chambers being in communication with one another by the passage or opening through such downwardly-directed tube or pipe 15, all as is clearly presented pictorially in Figure 2.

An upright electrode or electric-terminal 18 extends outwardly through the casing-section 11 through a bushing 19 of insulating-material above which the terminal is fitted with a rubber or equivalent sealing-ring 21 maintained in proper functioning relation with the terminal and with the bushing by a nut 22 on the upper screw-threaded part of the terminal, an electric-conductor 23 forming part of the circuit controlled by the switch being fastened to the upper end of the terminal at 24 in any suitable or approved manner, the electric-battery 25, or other appropriate source of electric-energy, for the circuit being shown.

As is clearly depicted, the companion wire or terminal 26 of such circuit is secured to the metallic casing at 27.

Such lower chamber or compartment is provided with a body of mercury or other electrically-conductive liquid 28 in quantity, under normal conditions or inactive status of the switch, sufficient to close the lower end of tube 15 and with a small portion surrounding the tube.

If preferred, the top surface of such body of mercury may be covered with a thin layer of oil 29 as a protective-means or safeguard against oxidation of the mercury.

Connected with the interior of casing-section 11, that is with its chamber 16, is a pipe 31 fitted with a casing 32 divided into two chambers by the usual, flexible, metallic, corrugated diaphragm 33 confined or bound around its border or edge between the two parts of the casing.

The use of such diaphragm-unit permits the employment of an inert gas in the chambers 16 and 17, if desired, with, or as a substitute for, the oil referred to.

Figure 1:
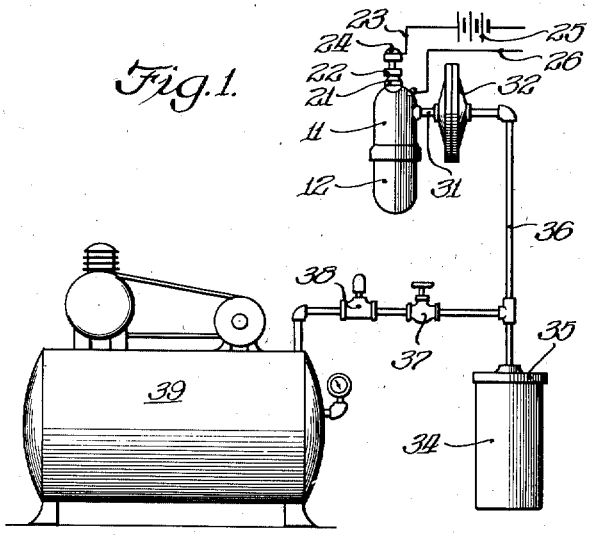
Figure 1 illustrates the general system when super-atmospheric pressure is used.

As shown in Figure 1 when the can 34 is to be tested as to possible leakage, its open top is temporarily closed and sealed by a cover 35, an aperture through which is connected by a pipe 36 to one side of the diaphragm-unit 32, an intermediate portion of pipe 36 being connected through a cut-off valve 37 and a pressure-regulating valve 38 to an air-compressor 39 from which the supply of air under suitable superatmospheric pressure is supplied to the interior of the can and to the unit 32 at one side of its flexible diaphragm.

Obviously, the air-pressure in the can undergoing test is the same as that on the outer side of the diaphragm 33, which, under the influence of such pressure, yields or flexes inwardly placing a substantially-equal or like pressure on the air or inert gas, as the case may be, in the upper chamber 16 and this pressure causes some of the air or gas to pass down through tube 15, displacing some of the mercury, and to become trapped in that part of the lower chamber surrounding the tube and above the mercury.

As long as these two pressures in the upper and lower chambers stay the same, the mercury remains out of contact with the terminal 18, but as soon as the pressure in chamber 16 decreases in minor degree, the slightly-greater, trapped pressure in the lower chamber forces the mercury up the interior of the tube until it contacts with the terminal, thereby closing the electric-circuit which action by mechanism, not shown, releases the defective can and ejects it as unsuitable for use, it being understood, of course, that such minor reduction in pressure in chamber 16 results from a like lessening of pressure in pipe 36 and the outer side of the diaphragm by reason of air-leakage from the can undergoing test.

It will be readily understood that when air pressure is applied to the upper compartment 16 it depresses the mercury seal and causes a trapping of air in chamber 17 above the mercury at a pressure equal to that in the upper chamber, minus the weight of the liquid in tube 15 and, therefore, any decrease in pressure in the upper chamber causes the mercury to rise in the tube, because of the trapped pressure in the lower chamber, and to contact electrode 18.

If there be no leak, there is no decrease in pressure, and, after a predetermined interval, if no such pressure reduction occurs, the can is found to be perfect and is passed along as such, its place being taken by the next can to be subjected to the test.

In some cases, it may be preferable to make trial of the can by subjecting its interior to a partial-vacuum or sub-atmospheric pressure, and, in that instance, the system portrayed in Figure 3 and the appliance shown in Figure 4 are used, being the same as those illustrated in Figures 1 and 2, except that instead of connecting the parts 31, 32, 33 and 36, as shown, pipe 131 is united with the lower compartment 17 above the mercury and is also connected with one side of the diaphragm-unit 32, 33, its opposite side being joined by a pipe 136 to the can 34, such latter pipe being subjected to a partial-vacuum through pipe 137 by means not illustrated.

This sub-atmospheric pressure draws a portion of the air, or inert gas, from the upper chamber 16 into the lower chamber 17 so that substantially-like pressures exist in both chambers with the mercury-switch open.

If air enters the can, because the latter is not completely leak-proof, such change or increase in pressure in chamber 17 causes the mercury to come into contact with terminal 18, thus closing the electric-circuit resulting in automatic rejection or expulsion of the can by means actuated by reason of the closing of the circuit and the electric-current resulting therefrom.

If the can is imperfect or unsound resulting in leaky characteristics, it is automatically rejected, but on the other hand, if no such fault becomes apparent in a predetermined period of time the can is moved along as approved.

Although the diaphragm-unit has been shown and described, its employment is not absolutely necessary, so far as the broader aspects of the invention are concerned, and in some cases its use can be omitted without resulting disadvantages.

From what precedes it will be clear that the improved, reliable and accurate circuit-closer or electric-switch incorporates no moving parts except the mercury and the diaphragm which flexes, if such diaphragm is employed.

It will be noted additionally, that by reason of the described mounting for the electrode, the latter is capable of vertical adjustment to allow control of the extent of leak or the time element involved which it requires to cause the liquid to rise sufficiently to contact with the terminal.

Again, further adjustment or control is available by regulation of the quantity of mercury used in the lower chamber, thus immersing the tube therein to varying depths.

Those skilled in this art will readily understand that this invention, as defined by the appended claims, is not necessarily restricted to the precise and exact structural details illustrated and described and that various changes or modifications may be made therein without departure from the essence of the invention, and without the loss or sacrifice of any of its material benefits and advantages.

We claim:

1. In a fluid-operated electric-switch having a casing divided by a wall into an upper chamber and a lower chamber, a downwardly-directed tube establishing communication between said upper and lower chambers and projecting downwardly into said lower chamber, a first electric-circuit terminal in said tube, an electrically-conductive liquid in said lower chamber normally closing the lower end of said tube and out of contact with said terminal, said liquid being connected to a companion electric-circuit terminal, and conduit-means connected to the interior of said casing, the novel feature being that said conduit-means is connected to one only of said chambers and is the sole conduit-means operatively associated with said casing, whereby by changing the pressure in said single conduit-means said liquid, constituting and acting as the movable member of a valve of which the other member is said tube, opens the lower end of said tube permitting the pressures in the two chambers to become approximately equalized, whereupon the liquid closes the lower end of said tube but out of engagement with said first terminal ready, however, and operative to contact said first terminal upon increase of the pressure in said lower chamber relative to that in said upper chamber.

2. The novel feature in fluid-operated electric-switches set forth in claim 1 in which said conduit-means is connected to said upper chamber.

3. The novel feature in fluid-operated electric-switches set forth in claim 1 in which said conduit-means is connected to said lower chamber outside of said tube and above said liquid.

4. The electric-switch set forth in claim 1 in which the portions of said chambers unoccupied by said liquid are filled with an inert gas and in combination with means to prevent escape of such gas from said chambers.

5. The electric-switch set forth in claim 1 in which said conduit-means is provided with a diaphragm-unit, the flexible diaphragm of which closes said conduit.

IRA A. WEAVER.
CLYDE H. PHELPS.